April 12, 1966   J. REY   3,245,133
MACHINE TOOL
Filed March 20, 1963   4 Sheets-Sheet 1
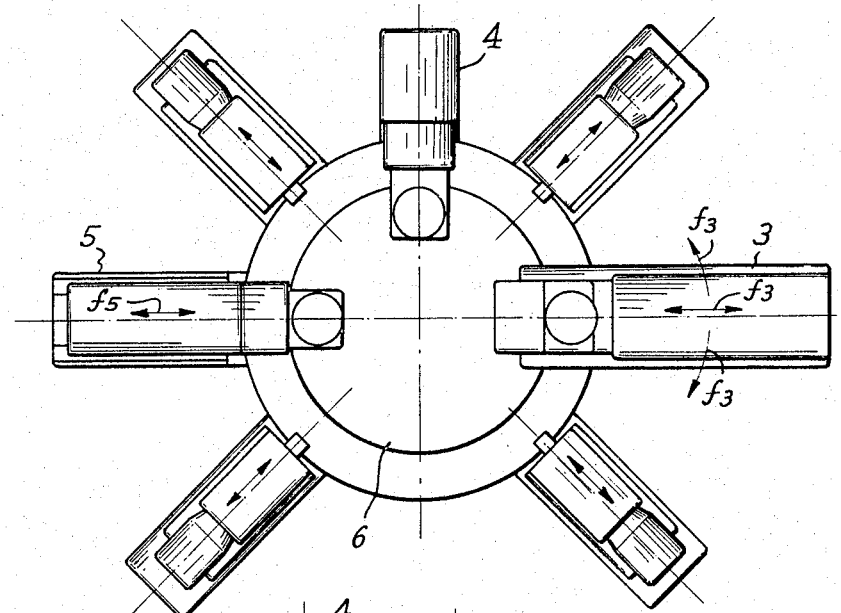
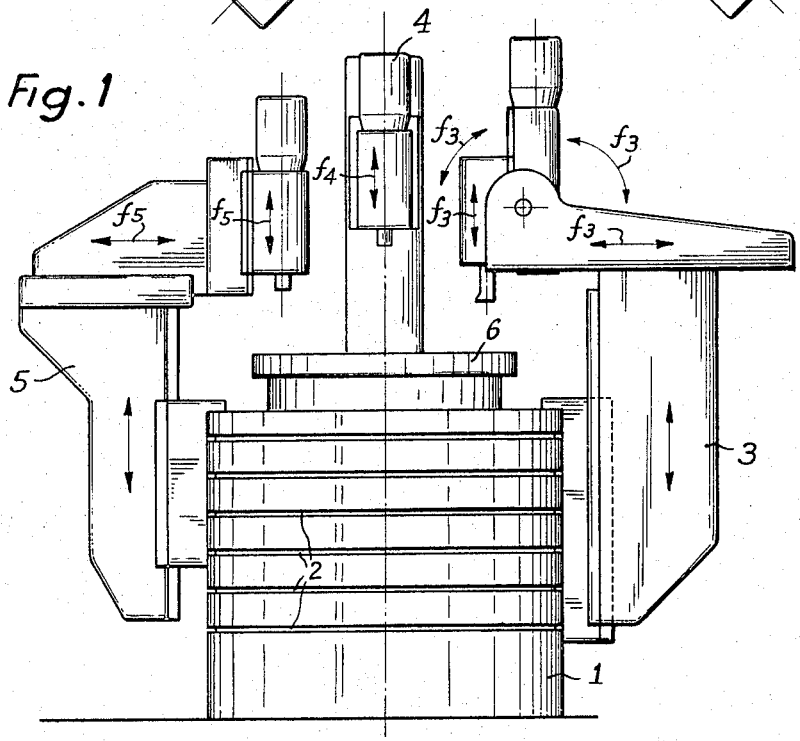
Inventor
JEAN REY
BY Flynn Marns Jangarathis April 12, 1966 J. REY 3,245,133
MACHINE TOOL Filed March 20, 1963 4 Sheets-Sheet 2

Inventor
JEAN REY
BY Flynn Marné Jangarathis

April 12, 1966　　　　　J. REY　　　　　3,245,133
MACHINE TOOL
Filed March 20, 1963　　　　　　　　　　4 Sheets-Sheet 3

Inventor
JEAN REY
BY Flynn Marn & Tangarathis

April 12, 1966     J. REY     3,245,133

MACHINE TOOL

Filed March 20, 1963     4 Sheets-Sheet 4

Inventor
JEAN REY
BY Flynn Marn & Tangarathis

United States Patent Office 3,245,133
Patented Apr. 12, 1966

3,245,133
MACHINE TOOL
Jean Rey, 153 Ave. des Minimes, Toulouse, France
Filed Mar. 20, 1963, Ser. No. 266,534
Claims priority, application France, Mar. 20, 1962,
4,783, Patent 1,318,415
5 Claims. (Cl. 29—38)

The present invention relates to a machine tool which alone permits of carrying out various machining tasks which normally necessitate the use of a plurality of machines.

The multi-purpose machine tool according to the invention is characterised in that it comprises, in combination:

A frame, at least part of the periphery of which is cylindrical and comprises means for the detachable securing of a plurality of machining heads, A chuck or a plate comprising means for securing the piece to be machined, this chuck or plate, the axis of which coincides with that of the frame, being connected to a motor through the intermediary of a gear box, Engageable means for rotating the plate step-by-step, by fractions of a revolution, and means for locking the plate at each stop, By virtue of which combination one or more pieces can be machined successively in one or more fashions, such as turning, truing, milling or drilling, without it being necessary to remove them from the plate.

In one particular form of embodiment of the invention, the machine comprises two motors, the shaft of the first being connected directly to the input shaft of the gear box, while the shaft of the second is connected to this input shaft through a reduction gearing comprising tangent wheel and worm.

According to one characteristic of the invention, the engageable means for rotating the plate step-by-step comprise a rack capable of coming into engagement with a pinion fast with the shaft of the plate, and connected to a first jack, and a second jack for bringing the rack into engagement with the pinion.

Figure 3:
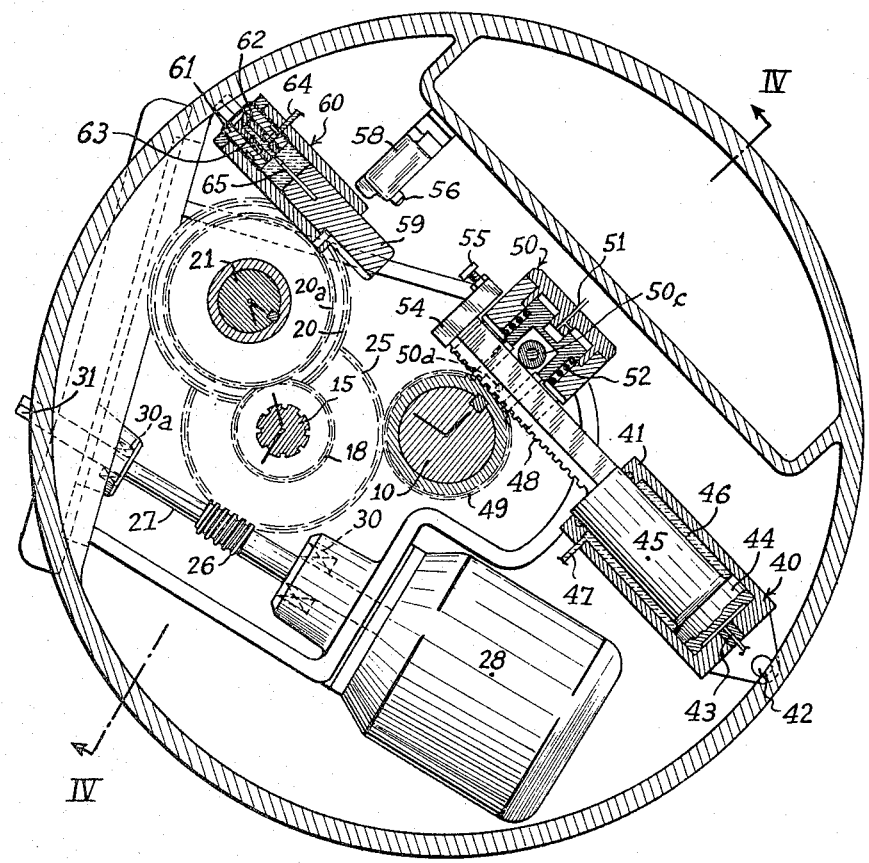
Figure 4:
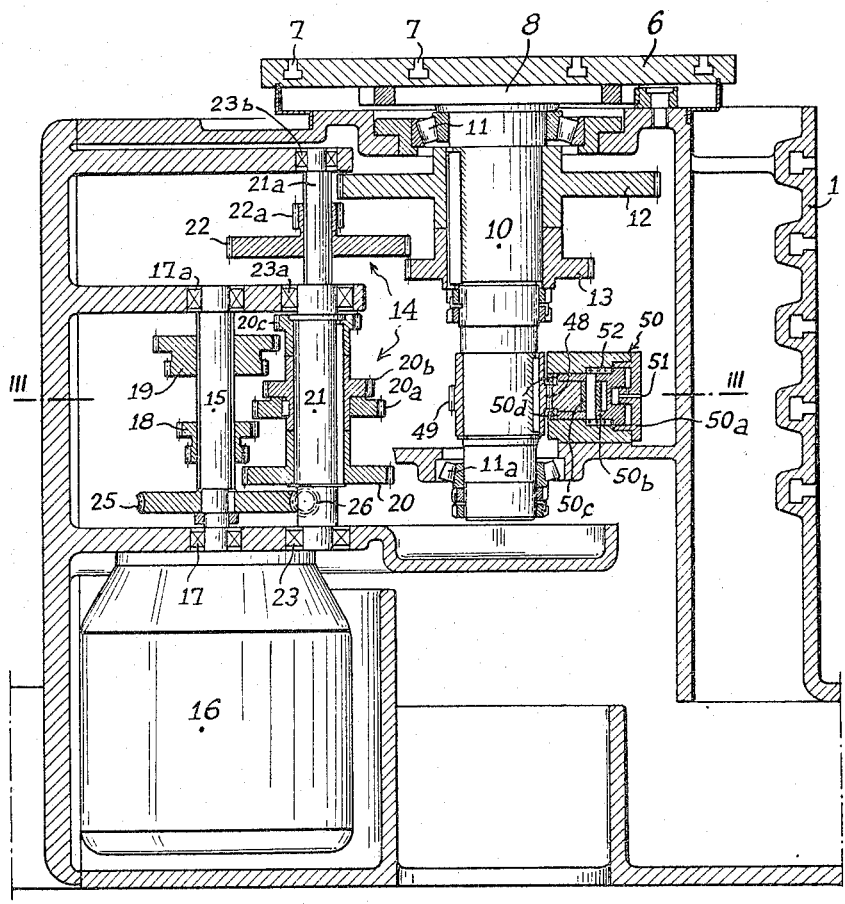
Figure 6:
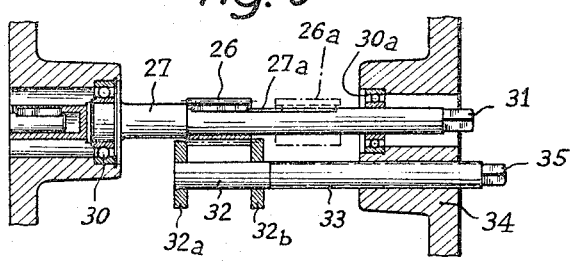
Figure 5:
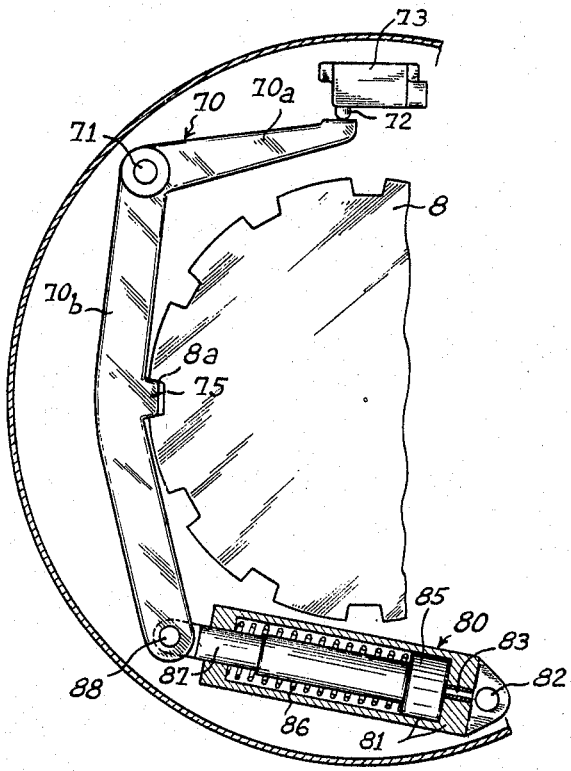
Figure 7:
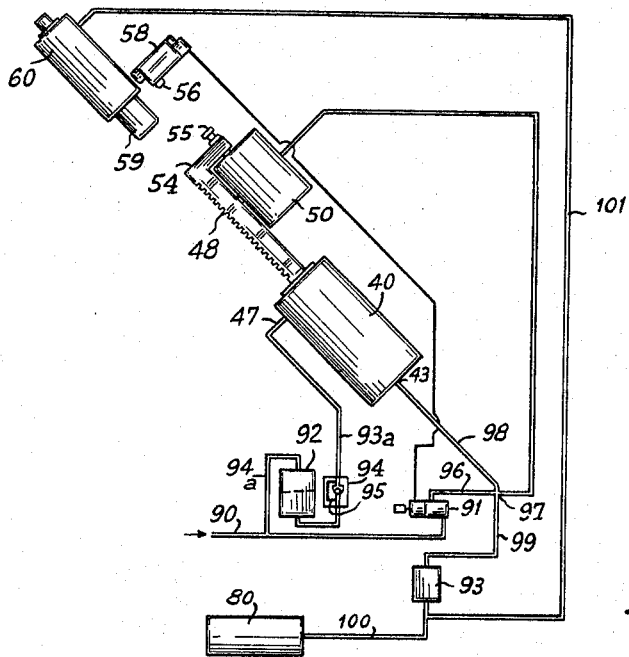

A form of embodiment of the multi-purpose machine tool according to the invention will be described hereinafter by way of non-limitative example with reference to the accompanying drawings, wherein:

FIGURE 1 is an over-all elevational view of the machine tool according to the invention, FIGURE 2 is a plan view thereof, FIGURE 3 is a sectional view thereof along the line III—III in FIGURE 4 and shows various control elements, FIGURE 4 is a developed sectional view along the line IV—IV in FIGURE 3, FIGURE 5 is a diagrammatic plan view of the device for the locking of the plate, FIGURE 6 is a diagrammatic view in vertical section of the device for the disengagement of the worm reduction gearing arrangement, FIGURE 7 is a diagram showing the various conduits of the machine.

In the drawings, the multi-purpose machine tool as represented as a whole in FIGURE 1 comprises essentially a frame 1 of generally cylindrical form possessing on its external lateral surface grooves 2 of T-shaped section permitting the mounting of tool-rests or machining heads 3, 4 and 5, which may however be in greater number.

These machining heads can be displaced and secured at various points of the periphery of the frame. They can be subjected to various relative movements for their adjustment, as indicated by the respective double arrows f3, f4, f5, between their component elements.

From the upper part of the frame 1 there emerges a rotating plate 6 which occasionally can be replaced by a chuck (not shown). This plate is provided with grooves 7 (FIGURE 4) of T-shaped cross-section, serving for the securing of the workpiece or pieces. Beneath the plate 7 there is fixed a notched disc 8, the purpose of which will be explained hereinafter.

The plate-disc assembly is supported by a vertical shaft 10 mounted on two roller bearings 11 and 11a, the axis of the shaft 10 coinciding with that of the cylindrical frame 1. On the shaft 10 there are keyed gear wheels 12 and 13 of different diameters with which there mesh the pinions of a gear box 14. This gear box 14 comprises trains of gear pinions mounted on two vertical parallel shafts 15 and 21.

The drive shaft 15 is fast with the shaft of a high-powered motor 16. On the shaft 15, mounted on ball bearings 17 and 17a, there are keyed in sliding fashion two double pinions 18 and 19. These double pinions, in moving longitudinally on the shaft 15 can come into engagement as follows: The pinion 18 with one or the other of two pinions 20, 20a of different diameters, and the double pinion 19 with one or the other of the pinions 20b and 20c, these four pinions 20, 20a, 20b, 20c being fixedly keyed on the transmission shaft 21.

This shaft 21 comprises a grooved extension 21a on which there is slidingly keyed a double pinion 22–22a, the large pinion 22 being able to come into engagement with the wheel 13 keyed on the shaft 10, and the small pinion 22a being capable of engaging with the wheel 12.

The transmission shaft 21 and its extension 21a are mounted on three aligned ball bearings 23, 23a and 23b.

The above-described assembly represents the means for drive of the plate 6 at high speeds by the high-powered motor 16; this drive at various relatively high speeds corresponds to work of the nature of turning or truing.

However other work can be carried out by the machine, such for example as milling, necessitating a drive of the plate at low speeds.

For this purpose on the drive shaft 15 of the gear box 14 there is keyed a gear wheel 25 driven by a worm 26 fast with the shaft 27 of a low-powered motor 28 with horizontal axis (FIGURE 3). This shaft 27 is mounted on ball bearings 30 and 30a and carries at its end a square end 31 permitting of possible manual drive by a hand wheel or crank. This hand wheel or crank could possibly co-operate with a fixed notched plate permitting of defining fractions of a revolution of the worm 27.

So that the high-speed drive of the plate by the motor 16 may be possible, the low-speed drive by the motor 28 must be disengageable.

For this purpose the worm 26 (FIGURE 6) is keyed on the shaft 27 with sliding splines permitting the displacement of this worm 26 on a grooved portion 27a of the shaft 27, which is long enough so that the worm 26 when coming into the position 26a shown in dotted lines is no longer in contact with the tangent wheel 25.

This longitudinaly displacement of the worm 26 is effected by a fork composed of two parallel discs 32a and 32b between which there is engaged a portion of the periphery of the worm 26. This fork is mounted at the end of a threaded rod 33 moving in a fixed, tapped base plate 34 serving also as support for the bearing 30a mounted on the shaft 27.

The end of the threaded rod 33 opposite to the fork 32 carries a square end 25 permitting of operation of the rod 33 by a hand wheel or crank.

The plate 6 can be driven in rotation step-by-step by fractions of a revolution by means of the following device (FIGURE 3), which is composed of a pneumatic jack 40 mounted for pivoting at its base about a spindle 42. In the end of the cylinder 41 of the jack 40 there is pierced a calibrated nozzle 43 through which compressed air can arrive. The piston 44 of the jack comprises a rod 45 of large diameter, forming a joint at the orifice of the cylinder 41 and leaving an annular space 46 of reduced volume between itself and the internal wall of the cylinder. An orifice 47 permits the admission of oil under pressure into this annular space 46. The rod 45 is extended by a rack 48 (FIGURES 3 and 4) which can come into engagement with a toothed ring 49 keyed on the shaft 10 of the plate, under the action of a pneumatic jack 50.

When compressed air is admitted through the nozzle 51 formed in the end 50a of the cylinder of the jack 50, the piston 50b presses the rack 48 against the toothed ring 49 through the intermediary of the roller 50c and brings it into engagement with the latter, against the action of the spring 52 which effects the disengagement by means of pins 50d, when the jack 50 is set to discharge.

The end of the rack 48 carries a stop piece 54 having at its end a buffer 55 placed opposite the button 56 of a micro-contact 58. In alignment with the rack 48 and opposite to the stop 54 there is situated the piston 59 of a hydraulic jack 60. The end of the cylinder of the jack is constituted by a sleeve 61 which is screwed into the cylinder and in which there is further screwed a throttle 62. The latter comprises an axial channel 63 of small diameter which communicates through the intermediary of grooves and drillings provided in the throttle and in the sleeve with a nozzle 64 permitting the admission of oil under pressure. The piston 59 carries a calibrated tapered needle 65, the progressive entry of which into the channel 63 brakes the evacuation of the oil contained in the cylinder of the jack 60. This semi-closure movement of the channel 63 by the needle 65 occurs when the stop 54 of the rack 48 comes, towards the end of the stroke of the rack, to press upon the piston 59 and push it back into the interior of the jack 60. This return movement of the piston is braked by the reduced passage left for the flow of the oil by the introduction of the needle 65 into the channel 63 and the rotation of the plate 6 is therefore retarded at the end of its stroke. The sleeve 61 forms an abutment for the piston 59 and its adjustment determines the travel of the rack; for its part, the adjustment of the throttle 62 determines the moment when the braking commences.

When the rack 48 has carried out one complete stroke under the action of the pneumatic jack 40, the plate 6 has rotated by a fraction of a revolution and is halted, preferably having slightly passed its index position.

It is then locked in its halted position by a device represented in detail in FIG. 5, comprising essentially a bolt 70 in the form of an angled lever pivoting about a fixed spindle 71. The arm 70a of the lever 70 has its end opposite the button 72 of an electric micro-contact 73 for controlling the locking, which may serve to control the starting of the machining heads.

The arm 70b of the lever 70 carries a stud 75 which comes into engagement with the recesses or notches 8a of the notched disc 8 fast with the plate 6, as stated above.

The introduction of the studs 75 into the notches 8a is facilitated by the rounded form of the lateral faces of the studs 75 and by the divergent form of the walls of the notches 8a, these arrangements ensuring the centering of the stud in the notch. The retarding of the plate due to the action of the hydraulic jack 60 also occurs before the stopping of the stud 75 opposite a notch 8a, and equally facilitates the introduction of one into the other.

The bolt 70 is controlled by a hydraulic jack 80 which pivots about a spindle 82. The end of the cylinder 81 of the jack 80 possesses a nozzle 83 through which oil under pressure is admitted. This nozzle is calibrated so that the passage of the oil to the exit takes place slowly, so that the locking of the notched disc 8 occurs without jerk.

The piston 85 of the jack 80 is pushed towards the end of the cylinder 81 by a spring 86 and the rod 87 of the piston 85 is connected to the bolt 70 through the joint 88; it follows that the action of the spring 86 causes the locking of the notched disc 8 by the entry of the stud 75 into a notch 8a. The unlocking occurs thus by the admission of oil under pressure into the cylinder 81, which pushes the piston 85, compressing the spring 86, and disengages the stud from the notch.

The control of the above-described jacks is effected by air and oil under pressure (FIGURE 7).

The air under pressure (for example 5 kg./sq. cm.) arrives through a conduit 90 with an electric valve 91, connected electrically to the micro-contact 58.

The oil is placed under pressure by the admission of compressed air on to its surface in reservoirs 92 and 93.

The distribution network of the pressure fluids is as follows:

A branch 94 on the air supply conduit 90 passes compressed air into the reservoir 92. The oil under pressure issues from this reservoir 92 through the conduit 93 and passes through a valve 94 provided with a by-pass 95 forming an output regulator, to terminate at the nozzle 47 of the jack 40. At the outlet from the electric valve 91 a compressed air conduit 96 passes through a cross-union 97 and terminates at the jack 50. From the cross-union 97 a branch 98 feeds the jack 40 through the nozzle 43; an opposite branch 99 passes air under pressure into the reservoir 93, which supplies oil under pressure on the one hand to the jack 80 through the conduit 100 and on the other hand to the braking jack 60 through the conduit 101.

The operation of the mechanism for the rotation of the plate by fractions of a revolution is as follows:

The compressed air issuing from the electric valve 91, through the conduit 96, supplies the jack 50 which places the rack 48 in engagement with the toothed ring 49. At the same time the compressed air through the conduit 99 places the oil under pressure in the reservoir 93, which through the conduit 100 acts upon the jack 80, causing disengagement of the bolt 70 and through the conduit 101 charges the jack 60, pushing back its piston 59 which disengages the needle 65 from the channel 62; finally the jack 40, fed more slowly with compressed air by the conduit 98 by reason of the reduced orifice 43, pushes the rack 48 which drives the shaft 10 and thus pivots the plate 6. The oil contained in the annular space 46 returns through the conduit 93 and the output regulator 95 to the reservoir 92.

When the stop 54 of the rack 48 comes into contact with the piston 59 of the jack 60, the movement retards until the moment when at the end of the stroke the buffer 55 presses the button 56 of the micro-contact 58, which interrupts the current of the electric valve 91 causing the discharge of all the jacks; this setting to discharge occasions the engagement and closure of the bolt 70 which immobilises the notched disc 8 and the plate 6, the disengagement of the rack 48 by the action of the spring 52 of the bolt 50, and the return of the jack 40 by the re-entry of its piston 44 under the action of the oil under pressure passed by the reservoir 92 into the conduit 93 through the valve 94 into the annular space 46, where it exerts its pressure upon the periphery of the piston 44. The micro-contact 73 controls the engagement of the bolt 70 as stated above.

The multi-purpose machine tool as just described possesses numerous advantages by reason of its multiple uses.

The machine is in fact simultaneously or separately, according to the tool-carriers with which it is equipped:

A vertical lathe with one or more tools,

A universal truing machine with one or more wheel-carrier spindles permitting of simultaneous execution of a plurality of truing operations, for example for a ring fixed by a magnetic plate, truing the outer diameter, the internal diameter and one face, A flat truing machine with rotating table with one or more wheel-carrier spindles, A milling machine with rotating table with one or more milling heads permitting the surface working of workpieces in one or more passes with continuous rotation of the table at slow speed, A transfer machine with rotating table with automatic indexing, with one or more machining units which can receive various tools for drilling, tapping, reaming, surfacing, turning, milling or other tasks.

In one case it is possible to mount one single piece at a time on the plate in order to carry out one or more of the above-mentioned machining operations.

In other cases it is possible for example to place twelve pieces which will be transferred automatically before eleven machining heads working at the same time upon the eleven pieces. The plate operating at twelve equal divisions per revolution will leave one station available for the discharging of a machined piece and the charging of a fresh piece for machining during the time necessitated by the longest machining operation, plus the very short transfer time.

The multi-purpose machine can have different variants of embodiment, in the manner of control of the different component elements, especially the number of the pinions of the gear box, the reduction ratio of the slow speed reduction gearing, the manner of unlocking of the bolt being capable of being effected by a cam, an eccentric or other means, instead of being unlocked by a hydraulic jack, and it being possible for all other variants to occur without thereby departing from the scope of the invention.

What I claim is:

1. A universal machining apparatus for use with a plurality of cutting tools and machining heads, said apparatus comprising: a frame at least one part of which is cylindrical and comprises means for securing said plurality of cutting tools and machining heads in detachable and displaceable fashion; a plate comprising a workpiece holder and a shaft mounted on said frame for enabling said plate to rotate about a vertical axis coincident with the axis of said frame; first motive means for producing continuous rotations at any one of a plurality of preselected speeds; second motive means for producing a succession of accurately determined stepwise rotational movements; and a gear box connected to said shaft and to both of said motive means for selectively transmitting to said shaft the motion produced by one or the other of said motive means; said first motive means comprised of two motors one of which is selectively connected directly to said gear box and the other of which is selectively connected to said gear box through a speed reduction system comprising a tangent wheel and a worm; whereby workpieces held on said plate can be successively machined in a plurality of ways, such as by turning, milling, and drilling, without it being necessary to remove the workpiece from the plate.

2. An apparatus as recited in claim 1 wherein said second motive means comprises: a pinion rigidly mounted on said shaft for rotation therewith, a rack mounted in said frame for selective engagement with said pinion; a first jack connected to said rack for causing it to drive said pinion; a second jack associated with said rack for bringing it into engagement with said pinion; and a third jack for automatically breaking the translational movement of the rack and the rotation of said plate before the end of each stepwise movement; an electric valve system connected to each of said jacks for controlling the admission and discharge of fluids thereinto; and a mechanically controlled micro-contact connected to control said valve.

3. An apparatus as recited in claim 1 wherein said worm is mounted in sliding fashion with respect to said tangent wheel, and said reduction system further comprises a manual control for sliding said worm out of engagement with said tangent wheel.

4. An apparatus as recited in claim 1 wherein said second motive means comprises: a pinion rigidly mounted on said shaft for rotation therewith; a rack mounted in said frame for selective engagement with said pinion; a first jack connected to said rack for causing it to drive said pinion; and a second jack associated with said rack for bringing it into engagement with said pinion.

5. An apparatus for indexing a rotatable member in predeterminable incremental steps, which comprises: a rack engageable with said rotatable member and for imparting rotational movement to said member; a pivotally mounted, pneumatically operable jack for imparting translational movement to said rack; a fixedly mounted, pneumatically operable jack including a roller engageable with said rack for urging said rack into engagement with said rotatable member; a fixedly mounted hydraulic jack normally filled with a liquid and including (i) a piston slidably mounted therein, (ii) a calibrated tapered needle secured to said piston, (iii) an internally threaded sleeve secured in one end thereof, (iv) an externally threaded throttle provided with an axial chamber for receiving said needle, and (v) said jack further being provided with a liquid outlet port, said throttle partially and adjustably screwed into said sleeve and said axial chamber in communication with said liquid and said outlet port; said rack engageable with said piston for progressively forcing said needle into said axial chamber and decreasingly forcing said liquid out of said outlet port such that the translational movement of said rack and the rotational movement of said rotatable member are retarded; said piston engageable with said adjustable sleeve for halting the translational movement of said rack and the rotational movement of said rotatable member.

References Cited by the Examiner

UNITED STATES PATENTS

| 2,393,696 | 1/1946 | Kraut | 29—26 |
| 2,513,710 | 7/1950 | Brauchler | 78—18 |
| 3,011,245 | 12/1961 | Mueller | 29—38.1 |
| 3,085,452 | 4/1963 | Thompson | 74—822 |

FOREIGN PATENTS

| 1,255,666 | 1/1961 | France. |

RICHARD H. EANES, JR., *Primary Examiner.*